United States Patent [19]

Walker et al.

[11] Patent Number: 4,909,154
[45] Date of Patent: Mar. 20, 1990

[54] AERODYNAMIC END CLOSURES FOR RAILWAY HOPPER CARS

[75] Inventors: Del E. Walker, Lake Quivira; Stephen R. Early, Olathe, both of Kans.

[73] Assignee: Aero Transportation Products, Inc., Kansas City, Mo.

[21] Appl. No.: 316,306

[22] Filed: Feb. 27, 1989

[51] Int. Cl.$^4$ .............................................. B61D 17/00
[52] U.S. Cl. ...................................... 105/1.1; 105/248
[58] Field of Search .................. 105/1.1, 1.2, 1.3, 247, 105/248, 249, 253, 254, 355, 404, 439, 463.1; 296/180.1, 180.4, 180.5

[56] References Cited

U.S. PATENT DOCUMENTS

| | | |
|---|---|---|
| 2,253,209 | 8/1941 | Patton .................................. 105/1.1 |
| 4,484,528 | 11/1984 | Anderson et al. .................. 105/248 |
| 4,569,289 | 2/1986 | Gielow et al. ....................... 105/1.1 |
| 4,696,237 | 9/1987 | Miller ................................... 105/248 |
| 4,756,256 | 7/1988 | Rains et al. .......................... 105/1.1 |

Primary Examiner—Douglas C. Butler
Attorney, Agent, or Firm—Kokjer, Kircher, Bradley, Wharton, Bowman & Johnson

[57] ABSTRACT

Apparatus for enclosing open end portions of railway hopper cars in order to reduce the aerodynamic drag. Each corner area of each end is provided with a shroud which includes a side plate and an end plate. The side plate covers the open side area at the end of the car and also covers the first vertical rib on the car side. The end plate covers the part of the end of the car adjacent the corner. Each shroud is shaped in an aerodynamically efficient configuration to minimize air resistance.

13 Claims, 2 Drawing Sheets

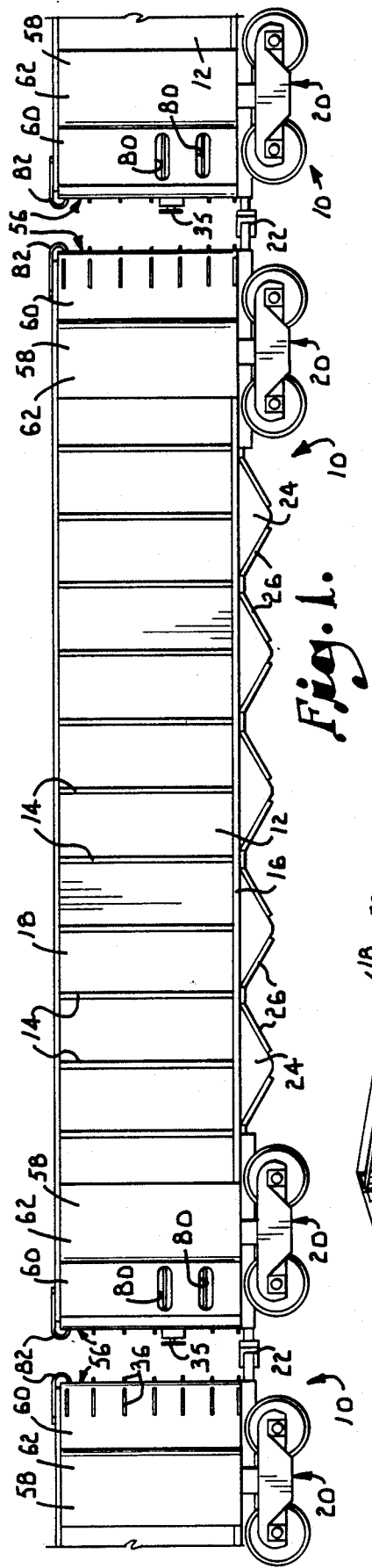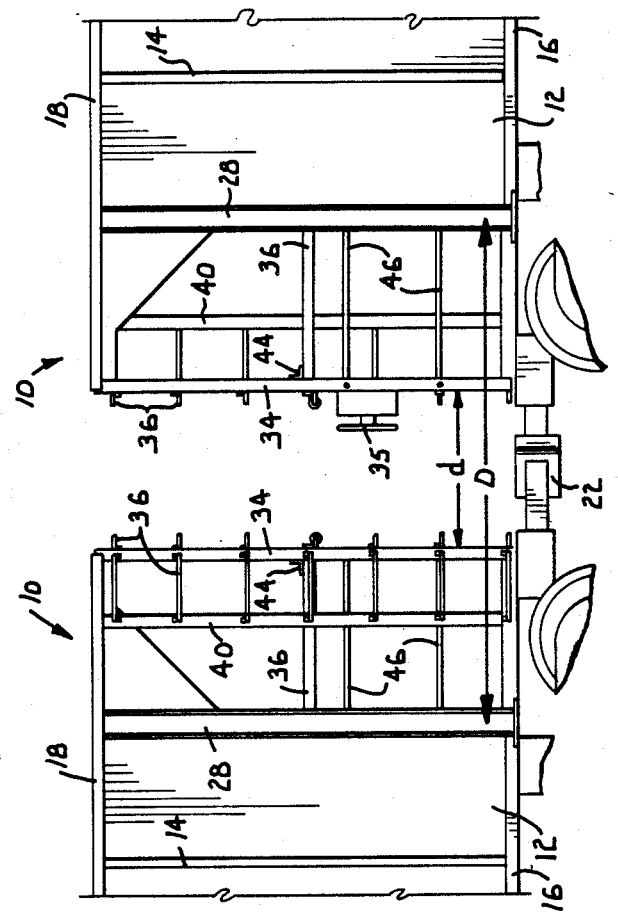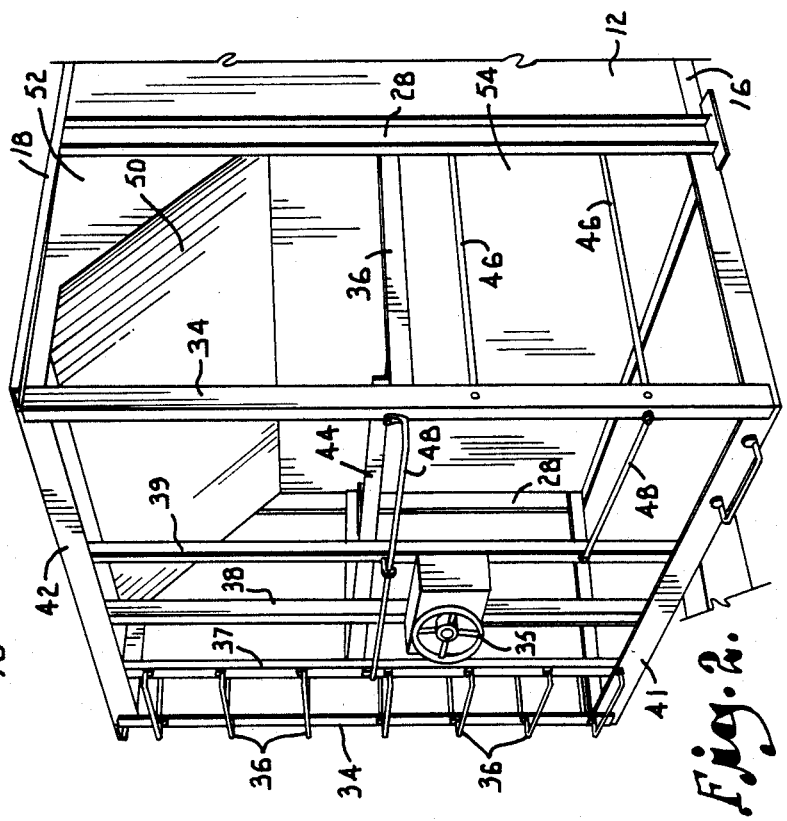

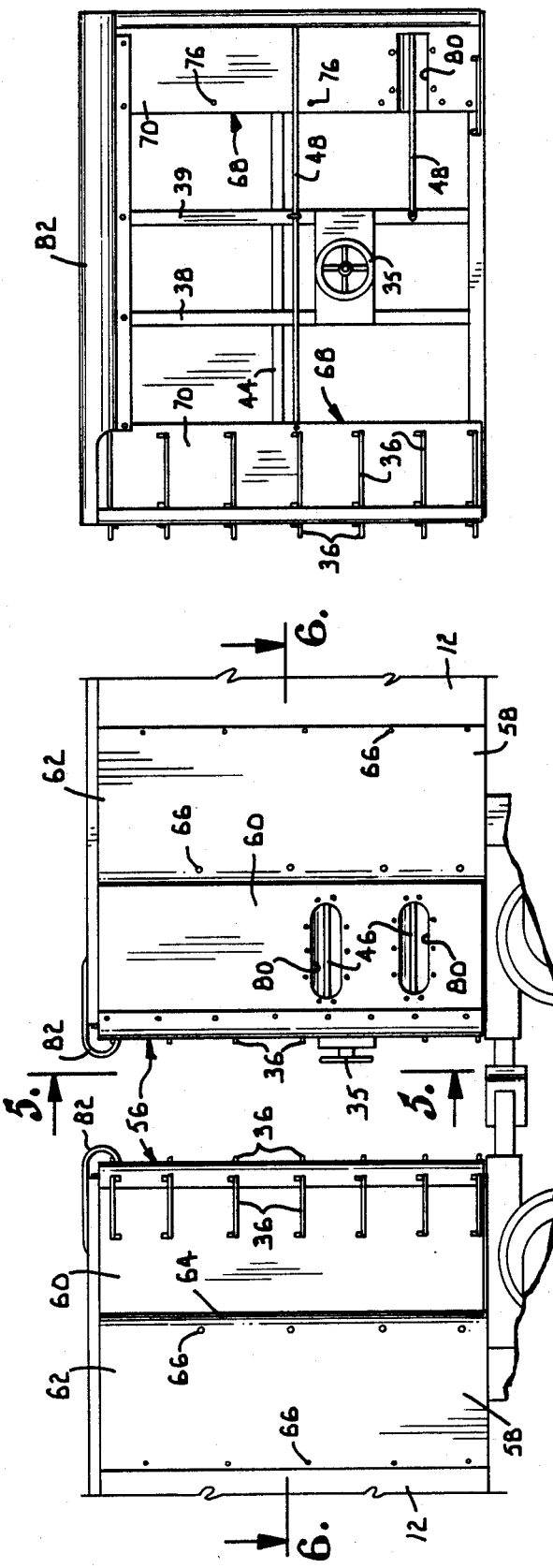
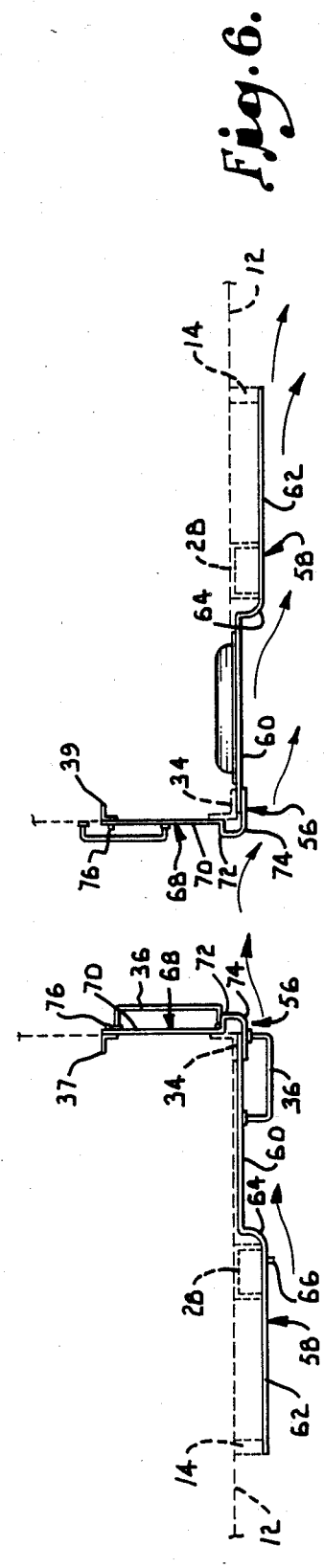

AERODYNAMIC END CLOSURES FOR RAILWAY HOPPER CARS

BACKGROUND AND SUMMARY OF THE INVENTION

This invention relates in general to railcars and more particularly to an arrangement for enclosing the ends of hopper cars in order to reduce aerodynamic drag forces.

Railway hopper cars are widely used to carry a variety of bulk commodities. Open top hopper cars find their widest application in transporting coal, while various chemicals and petrochemicals are commonly transported in covered hopper cars.

Both open top and covered hopper cars have ends which are characterized by an open architectural style. The manner in which the cars are constructed results in an open region below each of the end slope sheets, and the open region is not covered or enclosed by the sides of the car. Frame members, ladders, brake equipment and the like are located at the ends of the hopper cars, but the ends are essentially open to air flow. It has been found that the open nature of the hopper car ends results in considerable aerodynamic drag which the locomotives must overcome and which therefore adds significantly to the fuel costs.

Because of the presence of the open ends of hopper cars, the effective inter-car gap is aerodynamically much greater than the actual distance between adjacent cars. For example, hopper cars that are 41 inches apart actually present a gap of approximately 90 inches between their end panels at the bottoms of the slope sheets. The open regions below the slope sheets together add approximately 49 inches to the effective inter-car gap. Consequently, the gap is large enough to enable large quantities of air to flow in behind one car and impinge upon the leading face of the next successive car. This creates a drag force which is multiplied by the number of hopper cars that are adjacent to each other in the consist. For a consist having a large number of hopper cars carrying coal or another cargo, the drag force that results from the open architectural style of the hopper cars can make a substantial contribution to the amount of fuel that is required to propel the consist.

The present invention has, as its principal goal, the reduction of the drag force that is encountered by railway hopper cars. In accordance with the invention, the hopper car ends are enclosed by aerodynamically efficient shrouds that decrease the effective inter-car gap and provide a configuration that is aerodynamically equivalent to a box car shape. Each shroud has a side plate which encloses the open side part of the hopper car and which also covers the adjacent vertical ribs on the side sheet of the car. An end plate of each shroud is applied to the end of the car and covers enough of the end to prevent significant air ingress. The shrouds are constructed of a lightweight material such as fiberglass, and their profile is specially shaped to achieve aerodynamic efficiency.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary side elevational view of a train consist which includes hopper cars equipped with end closures constructed according to a preferred embodiment of the present invention;

FIG. 2 is a fragmentary perspective view on an enlarged scale of one end of a railway hopper car of the type to which the end closures of the present invention may be applied;

FIG. 3 is a fragmentary elevational view of a pair of coupled hopper cars of the type to which the enclosures may be applied;

FIG. 4 is a fragmentary side elevational view similar to FIG. 3, but showing the end closures of the invention applied to the adjacent ends of the hopper cars;

FIG. 5 is a fragmentary end elevational view taken generally along line 5—5 of FIG. 4 in the direction of the arrows; and FIG. 6 is a fragmentary diagrammatic view taken generally along line 6—6 of FIG. 4 in the direction of the arrows and illustrating the manner in which the end closures reduce aerodynamic drag.

DETAILED DESCRIPTION OF THE INVENTION

Referring now to the drawings in more detail and initially to FIGS. 1-3, the present invention is directed to an arrangement which is used to reduce the aerodynamic drag on railway hopper cars such as the open top hopper cars which are generally identified by numeral 10 in FIG. 1. When connected together in a train consist, the hopper cars 10 are coupled end to end. Each car has a body which includes opposite side sheets 12 each strengthened by a plurality of upright ribs or posts 14 which are spaced apart from one another along the outside surface of the side sheets 12. The posts 14 extend from side sills 16 to top side chords 18 (also known as bulb angles) which extend along the upper edges of the side sheets 12. Each hopper car 10 is equipped with front and back wheel assemblies 20 which travel along the rails. The cars 10 are connected end to end by couplings 22.

The interior of each hopper car 10 may be partitioned into a plurality of compartments in which bulk commodities such as coal are carried. Each compartment is provided with a hopper chute 24 located on the bottom of the car 10. The hopper chutes 24 provide outlets through which the cargo is discharged, and the chutes 24 are equipped with gates 26 which may be opened to effect discharge from the compartments.

The present invention is applicable to both open top hopper cars which typically transport cargo such as coal and to covered hopper cars which typically transport chemicals, petrochemicals and grain.

Both open top hopper cars and covered hopper cars have end portions which are characterized by an open architectural style having a configuration such as that illustrated in FIGS. 2 and 3. Upright channels 28 are located at the ends of the side sheets 12 and extend between the side angle 16 at the bottom and the top chord 18 at the top. Corner posts 34 at the four corners of the car 10 extend between the ends of the side sills 16 and the top chords 18. The corner posts 34 may take the form of rigid angle members. Horizontal braces 36 preferably formed by angle members extend between intermediate portions of the channels 28 and corner posts 34.

Each hopper car 10 has what is referred to as an "A" end and a "B" end, which differ from one another primarily in that the "B" end is equipped with a hand brake 35. By convention, the left side of the car is on the left from a vantage point at the "B" end looking forward to the "A" end. The right corner of the "A" end and the left corner of the "B" end are equipped with ladders having spaced apart rungs 36 which allow service and loading personnel to safely climb to the top of the care. The rungs 36 on the end of the care extend between the corner post 34 and another post 37 which may take the form of an angle. Post 37 is located between the corner post 34 and a center post 38 on the end of the car. On the "B" end of the car, an additional post 39 is provided to assist in mounting the hand brake 35. The ladder rungs 36 on the side of the car extend between the corner post 34 and a post 40 (FIG. 3) located between the corner post and the channel 28.

The upright posts 34, 37, 38 and 39 on the end of the car 10 extend between a bottom end sill 41 and an end chord 42. Sill 41 extends between the side sills 16 on the opposite sides of the care. Chord 42 extends between the top chords 18 on opposite sides of the car. Horizontal braces 44 provide bracing between the upright posts. Horizontal grab irons 46 are provided on the left side of the "A" end and on the right side of the "B" end and extend between the channels 28 and corner posts 34. Additional grab irons 48 are provided on the end at locations not occupied by the ladder rungs 36.

Each end portion of the car 10 includes an inclined end slope sheet 50 which forms part of the adjacent hopper compartment within the car. The hopper compartment is covered at the side by triangular end slop sheet sides 52. Vertical end panels 54 extend downwardly from the slope sheet 50 at locations adjacent to the channels 28.

The construction and configuration of the car ends provides a framework which supports the safety ladders and the grab irons 46 and 48. Both ends of the car have a cross-over step which provides a safety step over the coupler that allows switching personnel to move from one side of the car to the other without contacting the coupler. The grab irons are located approximately four feet above the cross-over step and allow the switching personnel to safely climb to the level of the cross-over step. The "A" right and the "B" left corners additionally have the ladder rungs 36. As best shown in FIG. 6, cars of this style often have the open end framework located slightly inboard (several inches) of the main side surface at the outer surface of the side posts 28.

The open architectural configuration has side frames between posts 28 and 34 which are essentially open beneath the slope sheet 50. Air is able to flow through these open side frames and into the end portion of the car. In addition, each car has an end frame formed by the posts on the end of the car, and the end frame is likewise essentially open to air flow.

Due to the presence of the open end portions of the hopper cars 10, the effective inter-car gap which is presented when the cars are coupled together is substantially greater than the actual distance between the adjacent cars. For example, when two cars are coupled together in the manner shown in FIG. 3, there is typically a distance of approximately 41 inches between the planes of the corner posts 34 of the adjacent cars, as indicated by the distance designated (d) in FIG. 3. However, since air is able to pass readily into the areas between the channels 28 and corner posts 34, the effective aerodynamic inter-car gap in the area below the slope sheets 50 is the distance designated by (D) in FIG. 3, which is the distance between the flat end panels 54. The distance (D) is typically about 90 inches in the case where the distance (d) is approximately 41 inches. As a consequence of the rather substantial effective gap (D), air is able to flow in behind the trailing channels 28 of the leading hopper car and impinge upon the flat surfaces of the slope sheet 50 and panel 54 of the trailing car. This air creates considerable aerodynamic drag which a locomotive must overcome in order to propel the consist.

In accordance with the present invention, the open end portions on the sides of the hopper cars are substantially enclosed by shrouds which are generally designated by numeral 56. Each end of each car 10 is equipped with two of the shrouds 56, one applied to each corner area. The shrouds serve principally to enclose the areas between the slope sheets 50 and the corner posts 34.

All shrouds 56 are constructed in substantially the same manner. As best shown in FIGS. 4–6, each shroud 56 includes a side plate 58 which covers the side frame between channel 28 and corner posts 34 and which also covers the channel 28 and the post 14 which is nearest the channel 28. Each side plate 58 includes two connected plate portions 60 and 62. Plate portion 60 is located nearer the end of the car and is large enough to cover the side frame. The other plate portion 62 covers channel 28 and rib 14 and is connected to plate portion 60 by a smoothly curved connecting portion 64 of the side plate 58. Because the framework on the end of the car is recessed inboard of the channel 28, the tow offset plate portions 60 and 62 are required and the transition portion 64 is required in order to provide aerodynamic efficiency and air flow along the side plate 58. The side plate 58 is applied to the railcar by placing the first plate portion 60 flatly against the outside surfaces of the corner post 34, the side sill 16, brace 44 and the slope sheet side 52. The curved portion 64 curves outwardly so that the second plate portion 62 clears the channel 28 which projects outwardly beyond the members of the side frame. The plate portion 62 is flat and is placed against the channel 28 and the outer surface of rib 14, terminating substantially at or slightly beyond the rib. The side plate 58 may be connected to the railcar in any suitable manner. For example, rivets 66 may be used to connect the plate portions 60 and 62 to the frame members and to channel 28 and the rib 14.

Each of the shrouds 56 also includes an end plate 68 which is illustrated as being separate from the side plate 58 but which may be formed as part of the side plate. Together, the side plate 58 and end plate 68 provide the shroud 56 with an L-shaped configuration. Each end plate 68 has a flat portion 70 which covers at least a portion (preferably about 18 inches) of the end frame adjacent to the corner post 34. Preferably, plate portion 70 extends from the corner post 34 to the nearest upright post. A corner airfoil 72 is formed on each end plate 68 at its junction with the side plate 58. The airfoil 72 preferably overlaps the adjacent edge of plate portion 60 and has a rounded corner 74 which enhances the aerodynamic efficiency of the shroud and reduces the impairment of air on the ends of the cars. The end plate 68 may be connected with the end frame of the railcar in any suitable manner, such as by applying rivet 76 to the frame members and the corner posts.

As best shown in FIGS. 4 and 5, the ladder rungs 36 are mounted on the outside of the shrouds so that the ladders may be easily scaled. Suitable cutouts 80 (see FIG. 4) may be provided in the shrouds at locations where the grab irons 46 and 48 are flush with or inside of the shrouds. The cutouts 80 provide adequate clearance around the grab irons to make access to them easy, and the ends of the cutouts are rounded for good aerodynamic characteristics, allowing air that gets into the cutouts to escape efficiently.

Preferably, each end of each car is also equipped with a top airfoil 82 which may be of the type disclosed in U.S. Pat. No. 4,569,289 to Gielow et al, although other airfoils can be used.

As previously indicated, each end of each hopper car 10 is equipped with two of the shrouds 56. One shroud is applied to each corner area so that both of the open side frames are enclosed and at least the portions of the end frames adjacent to the corner posts 34 are covered.

Application of the shrouds 56 results in the effective inter-car gap being reduced to the dimension (d), since the normally open sides of the end portions of the cars are closed off and the only gap that is present is between the end plates 68 which are spaced apart by the distance (d). Consequently, a considerable reduction in the effective intercar spacing is achieved, and this results in the consist acting aerodynamically substantially the same as if the consist had a continuous side surface along its entire length. Because of the presence of only a relatively short inter-car gap, the air is unable to flow between the cars in appreciable quantities and generally follows the path illustrated by the arrows in FIG. 6. As a consequence, the air does not impinge upon the leading faces of the cars to any appreciable extent, and the aerodynamic drag is reduced considerably in comparison to the normal situation where there is a decided aerodynamic drag force that must be overcome.

Preferably, the shrouds 56 are constructed of a lightweight material such as fiberglass so that the additional weight on the car 10 is minimized. The curved connecting surfaces 64 are aerodynamically efficient and are able to smooth out the air flow past them. By covering the channels 28 and the initial posts 14 on the sides of the railcar, air resistance is reduced and thus reduces the drag that would otherwise be encountered. The aerodynamically efficient shapes of the airfoils 72 and the rounded corners 74 further enhance the aerodynamic efficiency of each shroud.

Testing has demonstrated that the use of the shrouds 56 can achieve a reduction in fuel use of approximately 8% when the locomotive consist is traveling at its normal cruising speed in open country.

It is also contemplated that the open floor area on the end of each car between the side sills 16 and the end sill 41 and end panel 54 may be covered or closed off by a panel welded or otherwise secured in place. This added floor panel prevents air from entering the end portion of the car from beneath the car.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Aerodynamic end closure apparatus for application to a railway hopper car having opposite sides and opposite end portions each presenting an inclined end slope sheet, an open end frame and open side frames below the slope sheet which intersect with the end frame at corners of the car, said apparatus comprising:
 a pair of shrouds for each end portion of the car, each shroud having an aerodynamically efficient said plate and an end plate; and
 means for mounting said shroud on the car with the side plates thereof covering said side frames and the end plates thereof covering portions of said end frame adjacent said corners of the car, whereby the end portions of the car are aerodynamically enclosed to reduce aerodynamic drag forces when the car is in motion.

2. Apparatus as set forth in claim 1, including rounded airfoils on side shrouds adjacent the corners of the car at the junctions between the side plates and end plates.

3. Apparatus as set forth in claim 1, wherein each side of the car presents a plurality of upright ribs thereon, each of said side plates having a configuration to cover at least the ribs nearest said side fame.

4. Apparatus as set forth in claim 3, wherein:
 each side plate has a first plate portion covering said side frame and a second plate portion covering said rib nearest the side frame; and
 said first and second plate portions of each side plate are connected by a curved portion of the side plate.

5. In a railway hopper car which includes opposite sides each having a plurality of upright ribs and opposite end portions each having an open architectural style formed by an inclined end slope sheet, an open end frame and open side frames below the slope sheet which intersect with the end frame at corners of the car, an aerodynamic end closure arrangement for each end portion comprising:
 a pair of aerodynamically efficient shrouds each having an L-shaped configuration which includes a side plate and an end plate;
 each side plate having a first portion secured to and covering the corresponding side frame and a second portion covering at least the rib nearest the side frame; and
 each end plate being secured to the end frame and covering a portion thereof adjacent the corresponding corner of the car, whereby the end portions of the car are aerodynamically enclosed to reduce drag forces applied to the car.

6. The end closure arrangement of claim 5, including an airfoil on each shroud located adjacent the corresponding corner of the car at the junction between the side and end plates of the shroud.

7. The end closure arrangement of claim 6, including a curved portion of each side plate connecting the first and second portions thereof.

8. The end closure arrangement of claim 5, including a curved portion of each side plate connecting the first and second portions thereof.

9. Apparatus for reducing aerodynamic drag on a train consist which includes coupled hopper cars having adjacent end portions each presenting an inclined slope sheet, an open end frame and open side frames below the slope sheet through which air can flow, said apparatus comprising:

a pair of shrouds for the end portion of each car, each shroud including a side plate having a size to cover the side frame of the car and an end plate for application to the end frame of the car; and means for mounting said shrouds on the cars in a manner to locate the side plates in covering relation to the side frames to substantially block air flow therethrough, said mounting means locating the end plates in covering relation to portions of the end frames adjacent the side frames.

10. Apparatus as set forth in claim 9, wherein:

each hopper car includes opposite sides each having a vertical rib adjacent the corresponding side frame; and each side plate includes a first portion covering the corresponding side frame and a second portion covering the adjacent rib.

11. Apparatus as set forth in claim 10, including a curved portion of each side plate connecting the first and second portions thereof.

12. Apparatus as set forth in claim 11, including a corner airfoil on each shroud adjacent the junction between the side and end plates thereof.

13. Apparatus as set forth in claim 9, including a corner airfoil on each shroud adjacent the junction between the side and end plates thereof.

* * * * *